July 13, 1926.
C. L. PAULUS ET AL
1,592,501
WIND COMPENSATOR FOR AIRCRAFT GUNS
Filed May 12, 1925    2 Sheets-Sheet 1
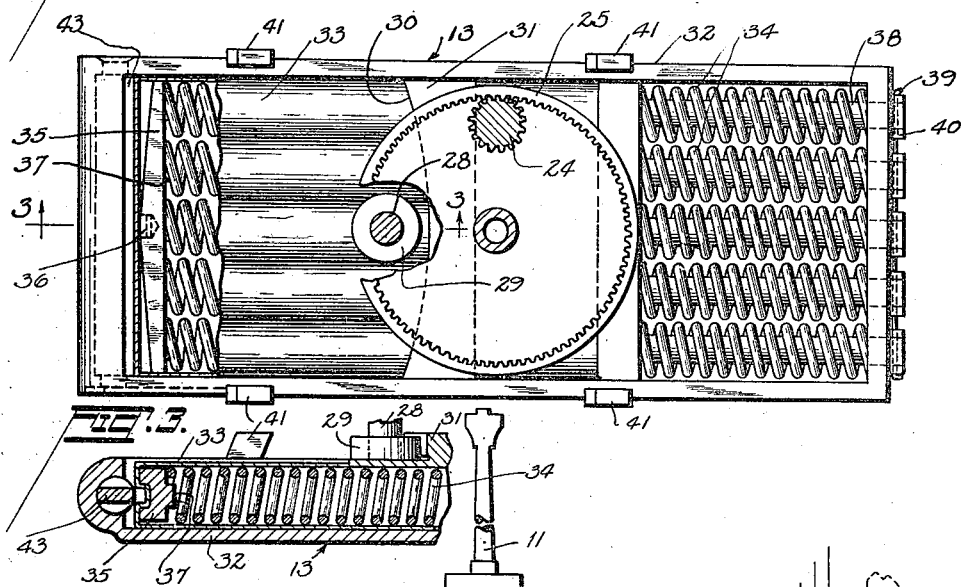
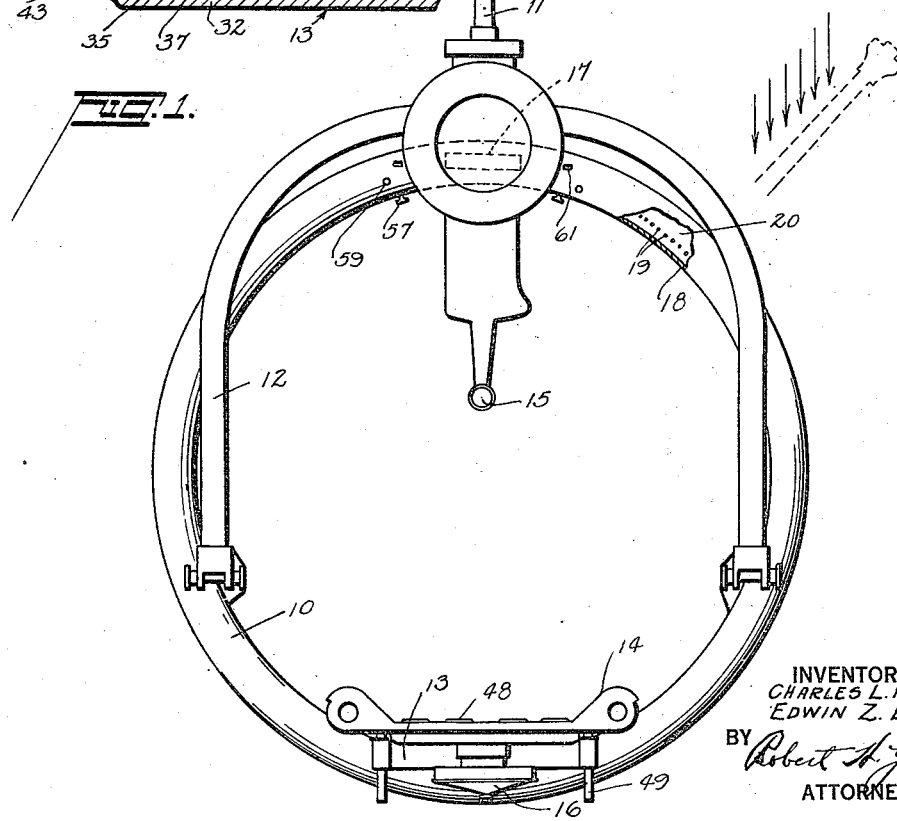
INVENTOR
CHARLES L. PAULUS
EDWIN Z. LESH
BY
ATTORNEY July 13, 1926.
C. L. PAULUS ET AL
1,592,501
WIND COMPENSATOR FOR AIRCRAFT GUNS
Filed May 12, 1925    2 Sheets-Sheet 2
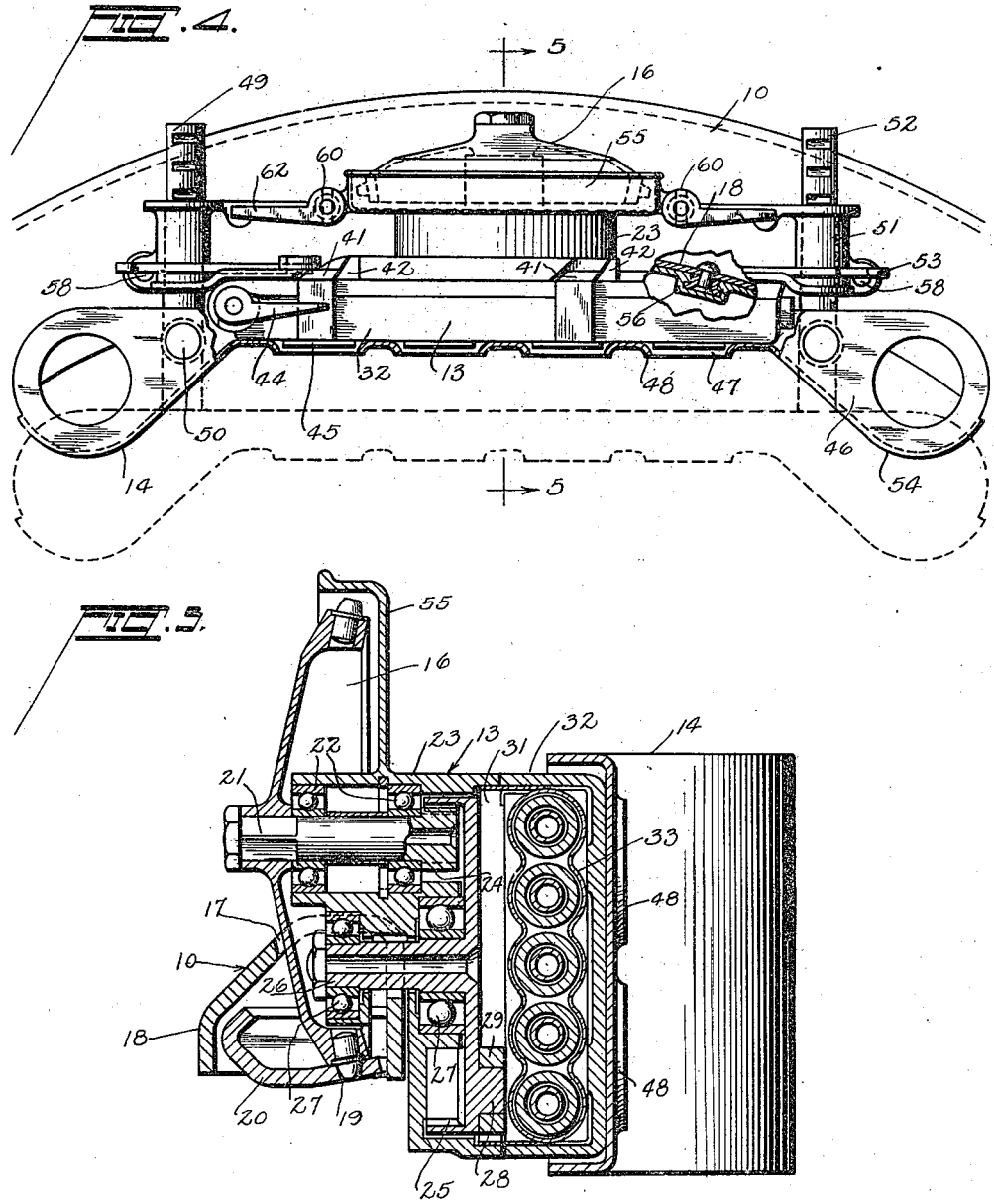
INVENTOR
CHARLES L. PAULUS
EDWIN Z. LESH
BY
ATTORNEY Patented July 13, 1926.

1,592,501

UNITED STATES PATENT OFFICE.

CHARLES L. PAULUS AND EDWIN Z. LESH, OF DAYTON, OHIO.

WIND COMPENSATOR FOR AIRCRAFT GUNS.

Application filed May 12, 1925. Serial No. 29,700.

This invention relates to wind compensators for the flexible guns of aircraft or other fast moving bases, for counterbalancing the effect of the slipstream upon the rotation of the gun and mount.

The principal object of the invention is to provide a wind compensator of an extremely compact construction, consuming the least possible room in the rather confined working space of the gunner's cockpit.

Another object of the invention is to provide resisting mechanism for the compensator of an improved form which operates in such a way no binding effect occurs between the movable and fixed rings of the gun mount due to the counter-balancing force exerted by the compensator.

Still another object of the invention is to provide a compensator of a form especially adaptable for providing a body rest for the gunner as this has been found to be practically essential to the easy actuation of the gun with its mount, since the gun is maneuvered with a twisting trunk movement of the body. An additional feature resides in a convenient adjustment for the rest to adapt the device to the requirement or preference of different gunners.

The invention is illustrated in the accompanying drawings in which—

Fig. 1 is a plan view of the layout of a gunner's cockpit showing the ring mount with the gun thereon and our improved compensator and body rest.

Fig. 2 is a view of the resisting means of the compensator disassembled from the device and showing the relation of the ring gear therewith, which is turned in the orientation of the gun and its mount.

Fig. 3 is a sectional detail taken on the line 3—3 of Fig. 2.

Fig. 4 is a plan view, partly in section, of the compensator and body rest on the ring mount, and Fig. 5 is an enlarged vertical cross section of the compensator taken on the line 5—5 of Fig. 4.

The sections in each case are taken looking in the direction of the small arrows:

Flexible aircraft guns as used by the Air Service of the U. S. Army and Navy are capable of movement with the ring mount for universal orientation and to be elevated or depressed as desired by the gunner. The elevation and depression of the gun is usually counterbalanced by suitable means and the present invention is confined to other means for counterbalancing the force of the slipstream which tends to rotate the gun to the rear when the gun is given a lateral deflection. The loads imposed upon the gun by the slipstream make it practically impossible to rotate the gun with its mount without auxiliary help. The compensator is therefore provided generating a counterbalancing force opposed to that of the slipstream, which is a maximum when the gun is broadside and of zero value when the gun is pointed dead fore or aft.

The compensator of our invention is illustrated in Fig. 1 mounted on a ring mount 10 diametrically opposite the air craft gun 11 with its flexible carriage 12. The compensator indicated by the numeral 13 is constructed, as will hereinafter appear, to provide a body rest or a support for an adjustable body rest 14, which the gunner rests against as he holds the spade grip 15 of the gun 11 and deflects the gun by turning the same with its mount with a twisting trunk movement of his body.

The compensator comprises a main drive gear 16 of the pin gear type which projects vertically through an opening 17 in the upper movable ring 18 of the ring mount 10 for meshing engagement in a series of circular holes 19 provided in the lower fixed ring 20 of the ring mount. The gear 16 is fixed to a shaft 21 received suitably in antifriction bearings 22 in a housing 23 supported on the upper movable ring 18 in a manner hereinafter to be described. The shaft 21 has integral therewith, at its inner end, a pinion 24 serving as an internal gear meshing with the internal gear of the ring gear 25. The gear 25 is in parallel relation with the gear 16 and closely alongside the same so as to consume the least possible space measured radially of the circular enclosure of the ring 10. It is integral with a stud 26 received in suitable antifriction bearings 27 in the housing 23. The gear 25 also has integral with it an eccentric crankpin 28 on its inner face, which carries a roller 29 which rides normally on the arcuate camface 30 of a follower 31 reciprocable inside the cover 32 of the housing 23. The follower 31 is integral with a casing 33 which constitutes one abutment for a plurality of coiled compression springs 34 inside the cover 32.

The follower 31 and casing 32 constitute together a yoke for simultaneously loading all of the springs 34 in the operation of the gear 25. The springs 34 bear against an equalizing bar 35 pivoted at its midpoint as shown at 36 in the end of the casing 33. Suitable studs 37 projecting from the bar 35 serve to position the springs alongside one another. The opposite end of the cover 32 constitutes the other abutment for the springs 34 and at this point a series of rods 38 are provided to prevent the buckling of the springs 34 under load. These rods are suitably held in place by a wire 39 passing through holes in lugs 40 and registering holes in the projecting ends of the rods 38. The springs 34, when assembled in the cover of the housing 23 are placed under initial compression approximating a total compression load of about six hundred pounds for all of the springs together. The springs hold the follower 31 in close contact with the roller 29 on the pin 28, even in the least compressed condition of the springs, due to the initial compression referred to. The initial compression also serves to secure the cover 32 in assembled relation to the housing 23. The cover 32 has a quickly detachable connection with the housing 23 by lugs 41 which have inclined faces co-operating with the inclined faces of lugs 42 provided on the housing 23. Normally the springs serve yieldingly to urge the cover to the right as seen in Figs. 2 and 4 and the follower 31 to the left as seen in Fig. 2. Provision is made for relieving the load of the springs to permit relative movement of the cover 32 on the housing 23 to the left as seen in Fig. 4 to enable the removal thereof. A rotatable cam 43 is provided in the one end of the cover 32 which is provided with an operating lever 44 on its outer end operable from the outside of the casing. In the position of the cam showing in Fig. 3 the movable abutment for the springs is moved to the right, thus enabling the follower 31 to move clear of the roller 29 on the pin 28 a sufficient amount to allow the lugs 41 to be moved clear of the lugs 42, so that the cover can be removed. An advantage of this construction is obviously that no fastenings requiring wrenches or screw drivers are provided and the easy assembling and disassembling of the compensator in service is enabled and inspection and maintenance are facilitated.

The arrangement described provides for a maximum counterbalancing force to counteract the slipstream when the gun is pointed broadside. The ratio between the rack of the fixed ring 20 and the gear 16 is equal to the ratio between the gear 25 and the pinion 24 so that 90° movement is communicated to the gear 25 when the movable ring has been transversed through 90°. At points in the neighborhood of this position of the gun the springs are given a greater compression for a given angular movement than at positions closer to dead fore and aft due to the form of the cam face 30 of the follower 31. It is obvious there is no counterbalancing force exerted by the springs with the gun pointed dead fore and aft, despite the fact that the full loading of the springs is accomplished at 180° from the position of the pin 28 shown in Fig. 2. The full loading is computed to be approximately 900 pounds. In the position 90° advanced from that shown in Fig. 2 the maximum counterbalancing effect is produced since the force acting on the crankpin 28 has no components as in the case of other positions.

The resisting means for the springs 34 is housed snugly within the cover 32 in parallel relation with the gears 25 and 16 and closely alongside the same so as to reduce the space consumed measured radially of the circular enclosure of the ring mount 10. It is desired to emphasize the fact that all of the parts are arranged in a vertical plane for the purpose of compactness radially of the circular enclosure so that the least possible room is taken up in the confined working space of the gunner's cockpit. The vertical disposition of the parts further enables the use of the housing as a place for a body rest for the gunner as will hereinafter appear. The vertical disposition of the main drive gear has been found to be of advantage also in that there is no possibility of the gear coming out of mesh with the resisting means under load as has been found to be oftentimes the case, due to an abnormal amount of play between the fixed and the movable rings of the gun mount. Wind compensators of the type heretofore provided are subject to the objection of causing a binding between the rings of the gun mount and of the gear coming out of mesh with its rack as there is usually sufficient lateral play between the rings.

The fact that the gun and its mount are manipulated by twisting trunk movements of the body dictates the use of a body rest for the gunner and our invention provides for a body rest on the wind compensator which may be provided either on the housing of the compensator itself or by an auxiliary rest adjustably and removably mounted on the housing of the compensator. In Fig. 4 there appear intermittent raised portions 45 provided on the back of the cover 32 to give in effect a nonskid surface while not rendering the bearing against the compensator uncomfortable to the gunner. Where more room is available in the gunner's cockpit or where the gunner's personal preferences dictate the use of an auxiliary body rest adjustable toward and away from the gun, the auxiliary rest 46 may be applied to the compensator. It is preferably of heavy sheet metal construction generally channel shaped with intermediate plain portions and projecting lateral portions at opposite ends. The plain portion overlies the back of the cover 32 where a non-skid surface is preferably provided by punching a plurality of lightening holes 47 and turning up the edges of the holes as indicated at 48 to roughen the surface. Besides serving to roughen the surface, the flanging of the edges of the holes 47 strengthens the body rest against buckling when the rest is not in contact with the back of the cover 32.

The holes 47 occur in such relation as to register with the spots where the intermittent raised portions 45 occur when the back rest is in contact with the cover 32. A pair of rods 49 are pivoted at the ends of the rest 46 as indicated at 50 and engage in bearings 51 at opposite ends of the housing 23 for adjustment fore and aft to bring the rest 46 closer to or farther from the gun 11 with either end more or less advanced as desired by the gunner. The latter kind of adjustment is necessitated by the fact that the gunner ordinarily stands with one foot forward and having his body necessarily somewhat diagonally of the cockpit. The rods 49 fit loosely in the bearings 51 to permit of independent adjustment of either of the rods and are provided with spaced notches 52 in which leaf springs 53 engage to lock the rest in its adjusted position. The gunner can raise the spring with one hand and move the end of the rest with the other hand to the desired degree of adjustment. The ends of the rest extend forwardly and curve rearwardly as shown at 54 to limit the movement of the gunner's body with respect to the compensator while at the same time avoiding the possibility of his catching his clothing or his parachute harness straps on the ends of the rest. A further provision to prevent entanglement with the wind compressor is a guard 55 on the housing 23 enclosing the gear 16 from the cockpit side.

The compensator is arranged for quick detachable connection with the movable ring 18 of the ring mount 10. Two sliding connections such as that shown at 56 are provided at opposite ends of the housing 23 by T-lugs 57 riveted on the inner depending wall of the ring 18 engaging in T-slots, provided on the adjacent face of the housing 23. The compensator is moved into position vertically relative to the ring mount with the lugs engaged in the slots described until dowels 58 at opposite ends of the housing 23 ride into holes 59 provided in the upper wall of the movable ring 18 of the ring mount 10. At the same time a pair of T-lugs 60 engage in narrow slots 61 in the upper wall of the movable ring 18.

The lugs 60 are operated by levers 62 from the top side of the compensator and when moved to the position shown in Fig. 4 with the lugs at right angles to the slots the compensator is securely, although removably, mounted on the ring mount. The function of the sliding connection 56 is to eliminate buckling of the compensator relative to the ring which might occur with the resisting means under load and tending to unmesh the gear 16. The dowels 58 hold the compensator against movement in any direction in a horizontal plane and the T-lugs 60 lock the wind compensator in position preventing its vertical movement toward removal from the ring mount.

As indicated in Fig. 1 the T-lubs 57, holes 59, slots 61 and opening 17 are duplicated diametrically opposite the indicated position of the wind compensator under the gun 11 to permit the placing of the wind compensator under the gun where that is desired either from the consideration that there is insufficient room in the cockpit or where the gunner for other reasons desires this location. In the position of the compensator designated in Fig. 1, the rest 14 or the rest afforded by the compensator itself serves as a back rest, but in the event of the compensator being located under the gun 11, the rest 14 or the rest provided by the compensator itself will serve as a stomach rest which may be found desirable especially in training the gun down and off the side of the cockpit.

We claim:

1. In combination, a gun ring mount comprising an upper movable ring and a lower fixed ring, and a wind compensator mounted on the upper movable ring and having a main drive gear vertically disposed and operating on a rack on the lower fixed ring.

2. In combination, a gun ring mount comprising an upper movable ring and a lower fixed ring, and a wind compensator mounted on the upper movable ring and having a main drive gear vertically disposed and operating on a rack on the lower fixed ring, said rack being provided by a circular series of holes formed in said lower ring.

3. In combination, a gun ring mount, comprising an upper movable ring and a lower fixed ring and a wind compensator mounted on the upper movable ring, and having a main drive gear projecting vertically through an opening provided in the upper movable ring, and a rack provided on the lower fixed ring to be engaged by said gear.

4. In a wind compensator for aircraft guns, the combination with a gun ring mount, of a main drive gear vertically arranged with respect to said mount, gearing driven therefrom arranged parallel with respect thereto, and in close proximity therewith to consume the least possible space in the circle enclosure of the ring mount, and resisting means operated from said last mentioned gearing also disposed in parallel relation therewith and compactly alongside thereof.

5. In a wind compensator for aircraft guns, the combination with a gun ring mount, of a main drive gear for said compensator meshing in a rack on the fixed ring of said mount, a pinion serving as an internal gear turning with said main drive gear, an internal ring gear driven from said pinion, a pin eccentrically arranged on said ring gear, and resisting means placed under load by said pin in the turning of said ring gear.

6. In a wind compensator for aircraft guns, the combination with a gun ring mount, of a main drive gear for said compensator meshing in a rack on the fixed ring of said mount, a pinion serving as an internal gear turning with said main drive gear, an internal ring gear driven from said pinion, a pin eccentrically arranged on said ring gear, and resisting means placed under load by said pin in the turning of said ring gear, the ratio of said main drive gear to the rack on said fixed ring being equal to the ratio between said ring gear and said pinion respectively.

7. In a wind compensator for aircraft guns, the combination with a horizontal ring mount for an aircraft gun, of a main drive gear meshing in a rack on the fixed ring of said mount, a housing fixed to the movable ring of said mount and providing a bearing for said main drive gear, a driven gear in said housing, a pinion turning with said main drive gear meshing with said driven gear, said pinion and said gears all being vertically disposed and rotatable on horizontal axes, resisting means to be loaded by said driven gear in the turning thereof, a follower for loading said resisting means, and a pin for operating said follower eccentrically arranged on said driven gear.

8. In a wind compensator for aircraft guns, the combination with a ring mount for an aircraft gun, of a main drive gear meshing in a rack on the fixed ring of said mount, a housing fixed to the movable ring of said mount and providing a bearing for said main drive gear, a driven gear in said housing, a pinion turning with said main drive gear meshing with said driven gear, resisting means comprising coiled springs to be compressed by said driven gear in the turning thereof, a follower for loading said resisting means, a pin for operating said follower eccentrically arranged on said driven gear, said resisting means being under an initial compression, and means acting between said housing and said resisting means to assume the compression of said resisting means, leaving said ring gear and the parts associated therewith free from the load of said resisting means.

9. In a wind compensator for aircraft guns, the combination of a main drive gear to be turned by meshing engagement with a rack in the gun mount when the gun mount is turned, a housing comprising two parts detachably held together, one part providing a bearing for said drive gear, a resisting means in the other part of said housing placed under load when said drive gear is turned, an operating connection between said resisting means and said drive gear, and means acting between said resisting means and the last named part of said housing whereby the load of said resisting means may be assumed by said housing part and the aforesaid operating connection relieved therefrom whereby said housing parts are freely detachable.

10. In a wind compensator for aircraft guns, the combination of a housing made in two parts detachable from one another by relative movement of one on the other, a resisting means under load in the one housing part, an actuating means therefor in the other housing part and having a detachable operating connection with said resisting means, said resisting means and the operating connection combining to hold said housing parts together, and means to relieve the load of said resisting means to enable relative movement of the housing parts to separate the same.

11. In a device of the character described, a housing, a driven gear in said housing having an eccentric crankpin thereon, a yoke reciprocated thereby, resisting means comprising a plurality of coiled compression springs arranged side by side to be loaded by the movement of said yoke, and an equalizing bar serving as the abutment for said springs and pivoted at its mid point relative to said yoke.

12. In a device of the character described, a housing, a driven gear in said housing having an eccentric crankpin thereon, a yoke reciprocated thereby, resisting means comprising a plurality of coiled compression springs arranged side by side to be loaded by the movement of said yoke, and an equalizing bar serving as the abutment for said springs and pivoted at its mid point relative to said yoke, said yoke having an arcuate cam face and said crankpin having a roller thereon engaging said cam face.

13. In a device of the character described, a housing, a plurality of coiled compression springs arranged side by side in said housing and bearing against one end of said housing, a movable abutment for the other ends of said springs, a member having means engaging said abutment to move the same and compress said springs, and means between said abutment and the adjacent end of said housing for moving said abutment free of its connection with said driven member.

14. In a device of the character described, a housing, a plurality of coiled compression springs arranged side by side in said housing and bearing against one end of said housing, a movable abutment for the other ends of said springs, an equalizer pivoted at its mid point on said abutment and having the springs bearing thereon, a driven member having means engaging said abutment to move the same and compress said springs, and means between said abutment and the adjacent end of said housing for moving said abutment free of its connection with said driven member.

15. In a device of the character described, a housing, a plurality of coiled compression springs arranged side by side in said housing and bearing against one end of said housing, a movable abutment for the other ends of said springs, a driven member having means engaging said abutment to move the same and compress said springs, and means between said abutment and the adjacent end of said housing for moving said abutment free of its connection with said driven member, said driven member being arranged midway between the ends of said housing, and said abutment extending thereto for operating connection.

16. In a wind compensator for aircraft gun mounts, the combination of a housing mounted on the movable ring of a gun ring mount, means in said housing operated by the movement of said movable ring relative to the fixed ring of said mount, a back cover for said housing, resisting means in said cover, said cover being quickly detachable from said housing by relative movement thereon in one direction, said resisting means serving yieldingly to urge said cover in the opposite direction, and means comprising a locking lever rotatable from the outside of said housing to compress said resisting means and relieve the load thereof to enable the disassembling movement of said cover.

17. In a wind compensator for aircraft gun mounts, a housing to be mounted on the movable ring, of a gun mount, a resisting means in said housing, a gear for loading said resisting means in the turning of said gun mount meshing with a rack on the fixed ring of said mount, and means for quickly detachably mounting said housing on said movable gun mount ring, comprising sliding connections between the ends of said housing and the inner face of said ring permitting vertical movement of said housing into place but preventing buckling thereof out of its vertical plane by the loading of the resisting means, a second means in the form of dowels engaging detachably in the upper face of said ring at opposite ends of said housing and preventing movement of said housing in any direction in a horizontal plane, relative to said ring, and means comprising locking levers engaging in the upper face of said ring, and rotatable to and from a locking position serving to hold said housing from vertical movement off of said ring.

18. In combination, a ring mount, a gun thereon, and a wind compensator on said mount diametrically opposite said gun having its housing providing a back rest for the gunner, said housing having a non-skid surface on the side presented to the gunner's back, and an adjustable non-skid back rest removably mounted on said wind compensator.

19. In combination, a ring mount, a gun thereon, and means on said mount diametrically opposite said gun providing a back rest for the gunner to assist him in turning the gun and mount with a twisting trunk movement of the body, said back rest being adjustable toward and away from said gun to suit the requirements of different gunners.

20. In combination, a ring mount, a gun thereon, and means on said mount diametrically opposite said gun providing a back rest for the gunner to assist him in turning the gun and mount with a twisting trunk movement of the body, said back rest being adjustable toward and away from said gun and to different extents at either side to suit the requirements of different gunners.

21. In combination, a ring mount, a gun thereon, a wind compensator arranged diametrically opposite said gun on said mount, and a back rest adjustably mounted on said compensator to assist the gunner in turning the gun and mount with a twisting trunk movement of the body.

22. In combination, a ring mount, a gun thereon, a wind compensator arranged diametrically opposite said gun on said mount, and a back rest having rods pivoted thereto at the opposite sides thereof and adjustably received in bearings on said wind compensator.

23. In combination, a ring mount, a gun thereon, and means on said mount diametrically opposite said gun forming a back rest for the gunner, said back rest having portions of the body thereof punched out to make lightening holes, the edges of which are raised to strengthen the rest against buckling and to give a non-skid surface for the purpose described.

24. In combination, a ring mount, a gun thereon, a wind compensator mounted on said ring mount opposite said gun and having its housing affording a back rest for the gunner, intermittent portions of the back of said housing being raised to give a non-skid surface, and an auxiliary back rest adjustably and removably mounted on said housing having portions of the body thereof punched out at intervals to make lightening holes and give a non-skid effect, said holes being arranged to register with the raised non-skid spots on the back of said housing when adjusted into proximity therewith.

25. In combination a ring mount, a gun thereon, and means on said mount diametrically opposite said gun forming a back rest for the gunner, said back rest comprising a plain intermediate portion for spanning the back and having lateral portions defining the sides of the back rest which project forwardly and then curve rearwardly, the whole serving to assist the gunner in turning the gun and mount with a twisting trunk movement of the body.

26. In a wind compensator, the combination with a ring mount consisting of an upper movable ring and a lower fixed ring, of a housing for said compensator to be supported on said upper movable ring, means providing a quick detachable connection between said housing and said upper movable ring by movement of said housing vertically relative to said ring, and locking means for holding said housing against movement relative to said ring in a vertical plane.

27. In combination, a gun ring mount, a gun flexibly mounted thereon and a wind compensator arranged to be removably mounted on said ring mount either diametrically opposite said gun or beneath the same.

28. In combination, a gun ring mount, a gun flexibly mounted thereon and a wind compensator arranged to be removably mounted on said ring mount either diametrically opposite said gun or beneath the same, said wind compensator having its housing conformed to provide a rest for the gunner to assist in turning the gun and mount with a twisting trunk movement of the body, said housing serving as a back rest in one position of said compensator and as a stomach rest in the other position.

29. In combination, a gun ring mount, a gun flexibly mounted thereon and a wind compensator arranged to be removably mounted on said ring mount either diametrically opposite said gun or beneath the same, said wind compensator having its housing conformed to provide a rest for the gunner to assist in turning the gun and mount with a twisting trunk movement of the body, said housing serving as a back rest in one position of said compensator and as a stomach rest in the other position, and an auxiliary rest removably mounted on said compensator and capable of adjustment toward the center of the ring mount.

30. In a wind compensator, the combination of a housing arranged to be mounted on the movable ring of a gun ring mount and conformed to provide a place for a rest for the gunner, a main drive gear vertically disposed and operating through an opening in said movable ring on a rack on said fixed ring, resisting means inside said housing operated by said drive gear, and a guard extending from said housing to cover said gear.

In testimony whereof we affix our signatures.

CHARLES L. PAULUS.
EDWIN Z. LESH.